G. B. N. DOW & J. F. CAVANAUGH.
VEGETABLE FORK.
APPLICATION FILED FEB. 5, 1913.
1,065,433.
Patented June 24, 1913.
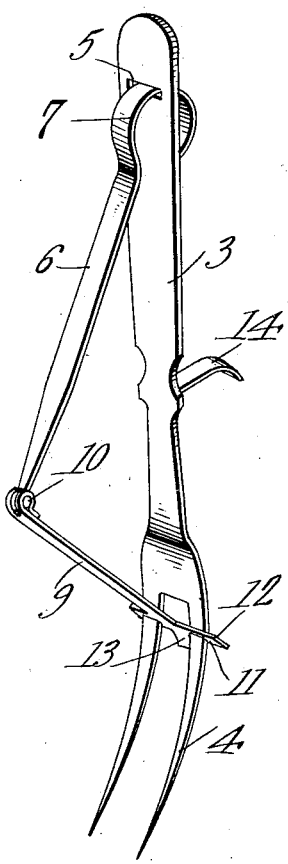
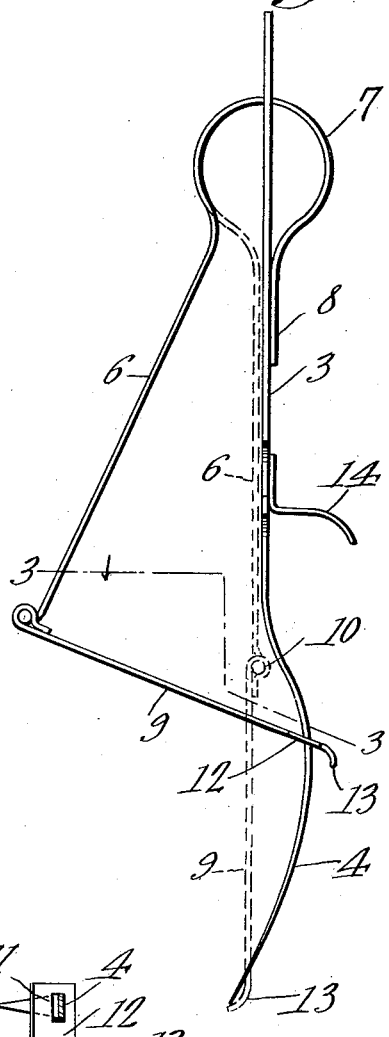
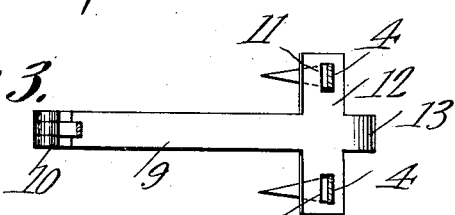
G. B. N. Dow AND
J. F. Cavanaugh
Inventors
Witnesses
by
Attorneys

UNITED STATES PATENT OFFICE.

GEORGE B. N. DOW AND JAMES F. CAVANAUGH, OF MANCHESTER, NEW HAMPSHIRE.

VEGETABLE-FORK.

1,065,433. Specification of Letters Patent. Patented June 24, 1913.

Application filed February 5, 1913. Serial No. 746,404.

*To all whom it may concern:*

Be it known that we, GEORGE B. N. DOW and JAMES F. CAVANAUGH, citizens of the United States, residing at Manchester, in the county of Hillsboro, State of New Hampshire, have invented a new and useful Vegetable-Fork, of which the following is a specification.

This invention relates to an improvement in forks and more particularly to improvements in a fork such as illustrated in Patent No. 540,958, granted to us June 11, 1895.

The object of the present invention is to provide a fork with an ejector attached thereto. The ejector and fork are so designed that it is unnecessary for the said ejector to travel to the extreme ends of the tines thereof and at the same time providing for the positive ejection of any material which may be located upon said tines.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the drawings accompanying this specification and forming a part thereof, the preferable form of our invention is illustrated, in which:—

Figure 1 is a view in perspective of our improved fork. Fig. 2 is a side view thereof. Fig. 3 is a cross sectional view taken on the line 3—3 of Fig. 2.

Referring to the drawings in which similar reference numerals designate corresponding parts throughout the several views, 3 is the handle of the fork and 4 the tines or prongs formed integral therewith. The upper portion of the handle is provided with a slot 5 therein through which extends a spring arm 6. The said spring arm is bent as at 7 and is secured to the fork handle at 8.

The ejecting arm 9 is pivotally connected to the spring arm 6 as at 10 and is provided with apertures 11 remote therefrom. The lower portion of the ejecting arm 9 is enlarged as at 12 and the central portion thereof is curved as at 13 to form an extending knob or lug which is adapted to come in contact with the material which may be upon the fork tines and to suitably eject the same therefrom.

A reference to Fig. 2 of the drawings discloses the fact that the outline or contour of the fork handle and tines is bent as is usual in fork construction and the spring arm 6 and the ejecting arm 9 are of such a length that when they are in the position as illustrated in dotted lines in Fig. 2 the portion 12 of the ejecting arm will be slightly shorter than the length of the fork so that the apertures 11 in the enlarged portion 12 will be prevented from going beyond the extreme ends of the tines 4 with the results that it will be impossible for the portion 12 to come off the said prongs or tines. It has been found in practice that for the successful ejection of any material which may be impaled upon the fork tines it was necessary that the loops or portions forming the apertures which travel over the fork tines to travel to the extreme ends thereof with the result however that the said ejecting arm was extremely liable to become disengaged from the fork tines, which would require the same to be resprung thereon. With the present invention however, the ejecting arm is so formed with the enlarged portion 12 and the projection 13 extending therefrom that it is possible to form the ejecting arm so that it will not travel to the extreme ends of the fork prongs or tines but that the curved projection 13 will extend beyond the ends of the tines and will thereby successfully eject the impaled material and thereby provide for the successful operation of the device without danger of the ejecting arm being disengaged from the fork prongs.

To the top portion of the fork handle is formed a suitable gripping projection 14 bent so as to form a means whereby the fork may be readily grasped and manipulated.

Having thus fully described the invention, what is claimed is:—

1. The combination of a fork, a resilient arm secured thereto, an ejecting member pivotally secured to said arm and slidably engaging the fork tines, a projection at the lower extremity of said ejecting member adapted to extend beyond the fork tines.

2. The combination of a fork, an arm movably secured thereto, an ejecting member pivotally secured to said arm and provided with apertures at the lower extremity thereof, said apertures adapted to slidably engage the fork tines, a curved projection at the lower extremity of said ejecting member adapted to extend beyond the extreme ends of the fork tines and eject material therefrom.

3. In a device of the class described, a pair of arms, one arm thereof formed as a fork, the other arm resiliently secured thereto and pivotally secured to an ejecting member, said ejecting member slidably engaging the fork tines, a curved projection secured to the lower end of said ejecting member, said ejecting member adapted to move longitudinally of said fork tines and to stop short of the ends thereof, said projection adapted to extend beyond said ends.

4. The combination of a fork, provided with an aperture in the handle thereof, a spring arm secured to said fork and extending through said aperture, an ejecting member pivotally secured to said spring arm, said ejecting member provided with an enlarged end, said end provided with apertures therein, said ejecting member adapted to slidably engage the fork tines and move longitudinally thereof and to stop short the ends thereof, a projection at the said enlarged end of said ejecting member adapted to extend therebeyond and a bent projection disposed at the lower portion of the said handle forming gripping means for the manipulation of the fork.

In testimony that we claim the foregoing as our own, we have hereto affixed our signatures in the presence of two witnesses.

GEORGE B. N. DOW.
JAMES F. CAVANAUGH.

Witnesses:
EDESSE ST. JEAN,
M. F. SHEA.

---

Copies of this patent may be obtained for five cents each, by addressing the "Commissioner of Patents, Washington, D. C."